United States Patent
Liebig et al.

(10) Patent No.: US 8,424,152 B2
(45) Date of Patent: Apr. 23, 2013

(54) ELECTRIC DEVICE HAVING AN ELECTRIC MOTOR AND STORAGE BATTERY PACK

(75) Inventors: Oliver Liebig, Bielefeld (DE); Dirk Wegener, Bielefeld (DE)

(73) Assignee: Miele & Cie. KG, Guetersloh (DE)

( * ) Notice: Subject to any disclaimer, the term of this patent is extended or adjusted under 35 U.S.C. 154(b) by 403 days.

(21) Appl. No.: 12/935,200

(22) PCT Filed: Mar. 28, 2009

(86) PCT No.: PCT/EP2009/002285
§ 371 (c)(1),
(2), (4) Date: Sep. 28, 2010

(87) PCT Pub. No.: WO2009/121532
PCT Pub. Date: Oct. 8, 2009

(65) Prior Publication Data
US 2011/0023264 A1    Feb. 3, 2011

(30) Foreign Application Priority Data
Apr. 2, 2008 (DE) .......... 10 2008 017 092

(51) Int. Cl.
*A47L 7/00* (2006.01)
*A47L 9/22* (2006.01)

(52) U.S. Cl.
USPC ............................... 15/339; 15/412

(58) Field of Classification Search ............ 15/339, 15/319, 412; 429/97
See application file for complete search history.

(56) References Cited

U.S. PATENT DOCUMENTS

| 4,969,229 A | * | 11/1990 | Svanberg et al. | ............... 15/339 |
| 5,480,734 A | | 1/1996 | Schulz et al. | |
| 6,448,732 B1 | * | 9/2002 | Block | ........................ 318/635 |
| 6,526,622 B2 | * | 3/2003 | Conrad | .......................... 15/319 |
| 7,950,107 B2 | * | 5/2011 | Pineschi | .......................... 15/412 |
| 2008/0256742 A1 | | 10/2008 | Bertram et al. | |
| 2008/0272760 A1 | | 11/2008 | Wiesner et al. | |

FOREIGN PATENT DOCUMENTS

| DE | 202006008476 U1 | 8/2006 |
| DE | 102005010124 B3 | 10/2006 |
| DE | 102006058613 A1 | 6/2008 |
| EP | 0593869 A | 4/1994 |
| WO | WO 2007/059784 A1 | 5/2007 |
| WO | WO 2007/073864 A2 | 7/2007 |

OTHER PUBLICATIONS

IRS from International PCT Application No. PCT/EP2009/002285, mailed Jun. 25, 2009.

\* cited by examiner

*Primary Examiner* — Dung Van Nguyen
(74) *Attorney, Agent, or Firm* — Leydig, Voit & Mayer, Ltd.

(57) ABSTRACT

An electrical appliance including a housing containing an electric motor and a storage battery pack for energizing the electric motor at an operating voltage of more than 42 volts. The storage battery pack includes a plurality of storage battery cells electrically connected so as to form at least two cell groups having a cell voltage of less than 42 volts. A connector assembly includes a bridge circuit configured to electrically connect the cell groups with each other so as to provide the operating voltage of more than 42 volts while establishing electrical connection between the storage battery pack and the electric motor.

14 Claims, 3 Drawing Sheets

ELECTRIC DEVICE HAVING AN ELECTRIC MOTOR AND STORAGE BATTERY PACK

CROSS REFERENCE TO RELATED APPLICATIONS

This application is a U.S. National Phase application under 35 U.S.C. §371 of International Application No. PCT/EP2009/002285, filed on Mar. 28, 2009, and claims benefit to German Patent Application No. DE 10 2008 017 092.5, filed on Apr. 2, 2008. The International Application was published in German on Oct. 8, 2009 as WO 2009/121532 A2 under PCT Article 21 (2).

FIELD

The present invention relates to an electrical appliance, particularly a canister vacuum cleaner.

BACKGROUND

German patent application no. 10 2006 058 613.1 describes a canister vacuum cleaner having a housing containing an electric motor and a storage battery pack including a plurality of storage battery cells for energizing said electric motor, the energization being at a voltage of more than 42 volts, and a connector assembly being provided for establishing electrical contact between the storage battery pack and the electric motor.

Conventional storage battery-powered electrical appliances are generally rated for an operating voltage of less than 42 volts. This value corresponds to the threshold specified in VDE 0700 for safety extra-low voltage. There are applications where such an operating voltage is not sufficient to deliver the desired power, especially when the current load is limited. Examples of this include the vacuum cleaners described in the above-referenced patent application, which are intended to provide a satisfactory suction power both during mains operation and battery operation. Therefore, a number of storage battery cells are used, which altogether generate an operating voltage of more than 42 volts, this voltage preferably being around 100 volts.

Since contact of persons with such a voltage must be prevented both during manufacture and during handling of the appliance, these persons cannot be expected to handle the appliance in the same way as devices containing extra-low voltage loads (flashlights, remote controls, etc.). In such devices, the storage battery cells required are individually inserted into a receiving compartment of the device, and then electrically interconnected via bridges provided therein. Using such a procedure, the voltage with which the user may come in contact would increase with every cell inserted. Storage battery packs, which are composed of a plurality of previously interconnected cells in a rigid inaccessible battery housing, also do not provide any solution to this problem because the connectors needed for establishing electrical contact between the storage battery pack and the electric motor would still be a potential hazard.

SUMMARY

An aspect of an embodiment of the present invention is to provide an electrical appliance using battery cells in such a way that both users and persons involved in the assembly of the appliance are protected against contact with live parts which are at voltage levels higher than the safety extra-low voltage of 42 volts.

In an embodiment, the present invention provides electrical appliance including a housing containing an electric motor and a storage battery pack for energizing the electric motor at an operating voltage of more than 42 volts. The storage battery pack includes a plurality of storage battery cells electrically connected so as to form at least two cell groups having a cell voltage of less than 42 volts. A connector assembly includes a bridge circuit that is configured to electrically connect the cell groups with each other so as to provide the operating voltage of more than 42 volts while establishing electrical connection between the storage battery pack and the electric motor.

BRIEF DESCRIPTION OF THE DRAWINGS

An exemplary embodiment of the present invention is described in more detail below and schematically shown in the drawings, in which.

DETAILED DESCRIPTION

In an embodiment, the present invention may prevent contact with voltages of more than 42 volts in a simple manner. In order to achieve this, the storage battery cells are electrically contacted with each other in such a way that at least two cell groups having a cell voltage of less than 42 volts are created, and that the connector assembly includes a bridge circuit which, while establishing contact between the storage battery pack and the electric motor, electrically contacts the cell groups with each other in such a way that they provide the operating voltage of more than 42 volts.

In this connection, the bridge circuit may be integrated into a part of the connector assembly that is not secured to the storage battery pack.

Moreover, the storage battery cells may be received in a battery housing which is provided with a male connector or a connector housing forming part of the connector assembly. In order to protect the storage battery pack from overheating, a temperature sensor can be provided in the battery housing, the connecting leads of the temperature sensor being connected to terminal contacts on the male connector or on the connector housing. It is convenient for the temperature sensor to be located in a portion of the battery housing closest to, or in a vicinity of, the electric motor.

Lithium-ion battery cells are subject to the dangerous goods regulations under the transportation regulations UN 3090, according to which the lithium content of a single cell must not exceed two grams, and the total lithium content of a battery pack must not exceed eight grams. These regulations are met by spatially and/or electrically separating individual cell groups. This is achieved in an embodiment of the present invention by providing a switch on the battery housing to allow disruption of the electrical contact between the storage battery pack and the electric motor and of the electrical contact between two cell groups and/or by separating the individual cell groups from each other within the battery housing partition walls.

Figure 1:
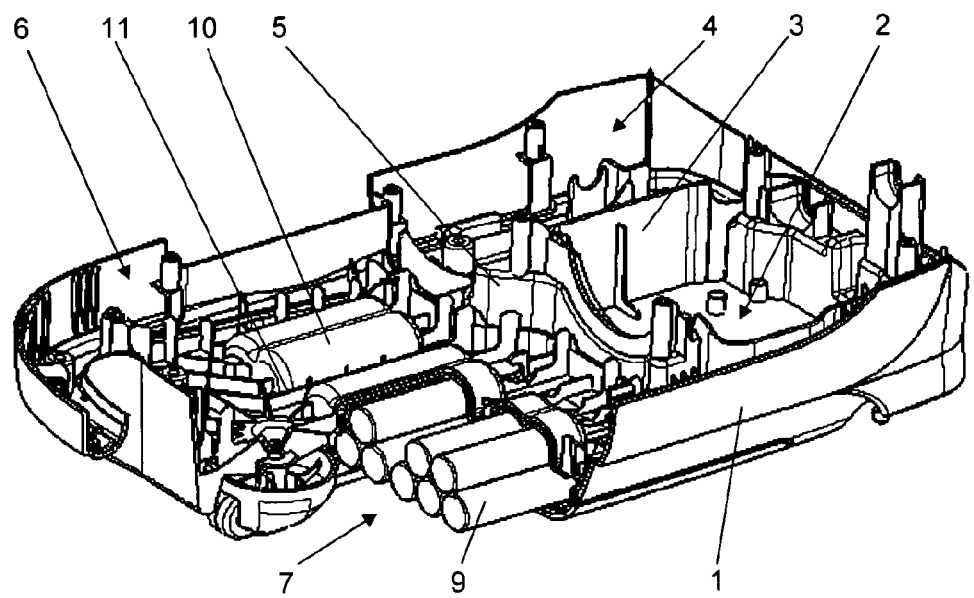
FIG. 1 is a perspective view of a lower housing part of a vacuum cleaner in accordance with an embodiment of the invention.
Figure 2:
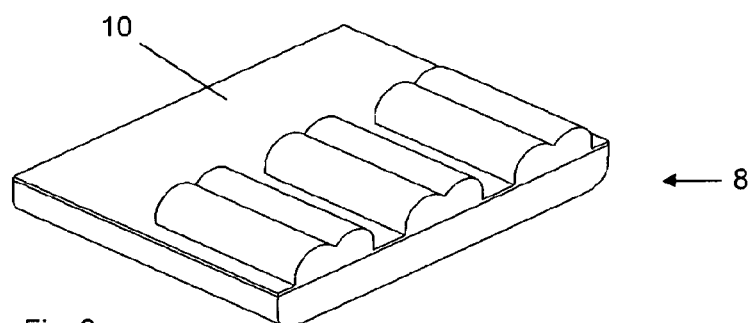
FIGS. 2 through 4 are different views of a storage battery pack in accordance with an embodiment of the invention.

FIG. 1 shows a lower housing part 1 of a vacuum cleaner in accordance with an embodiment of the invention. This vacuum cleaner has a suction fan which is driven by an electric motor. The suction fan and the motor are disposed in a motor fan chamber 2, which is separated by a first partition wall from a chamber 4 for receiving a cord reel and by a second partition wall 5 from a dust collection chamber 6. The dust collection chamber 6 may contain a dust separator, which may be a dust bag, a filter, or a container configured to act as a cyclone separator, inertial separator, or other kind of separator.

Figure 5:
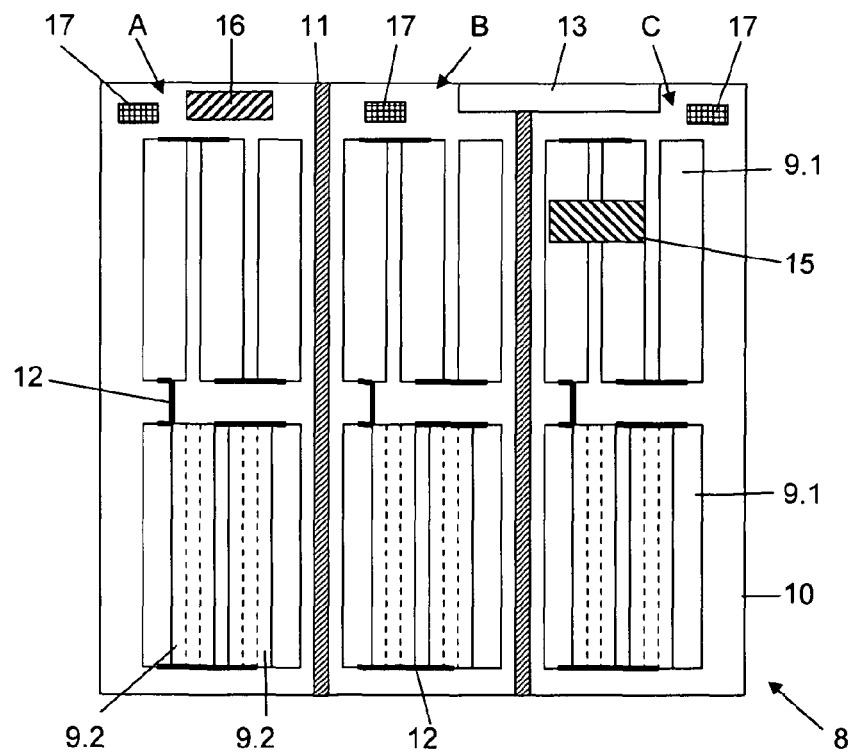
FIG. 5 is a schematic view of the storage battery pack of FIGS. 2-4.

A storage battery pack 8, shown in FIGS. 2 through 5, is disposed in a receiving compartment 7 (see also FIG. 7) in a plane below motor fan chamber 2 and below dust collection chamber 6 so as to allow the vacuum cleaner to be operated independently of the mains power supply. In order for the fan to produce enough suction power also when operating in this mode, storage battery pack 8 contains a multiplicity of individual storage battery cells 9. In the example shown, a total of 24 cells with a maximum voltage of 4.2 volts each are provided, so that when connected in series, these cells 9 provide a maximum voltage of 100.8 volts. Cells 9 are received in a battery housing 10. Cells 9 are divided into groups of eight each, which are spatially and electrically separated from each other. FIG. 5 schematically shows individual cell groups A, B and C, in which 2×3 cells 9.1 are arranged in a lower layer, and an additional two cells 9 are packed, in an upper layer, onto the three cells 9 located at the front in the lower layer (see also FIG. 3). Storage battery pack 8 is disposed in the vacuum cleaner is such a way that the region where cells 9 are packed on top of each other is located directly below dust chamber 6, and thus in a well ventilated region (see also FIG. 1). The region where there is only a lower layer extends into the region below motor fan chamber 2.

Figure 3:
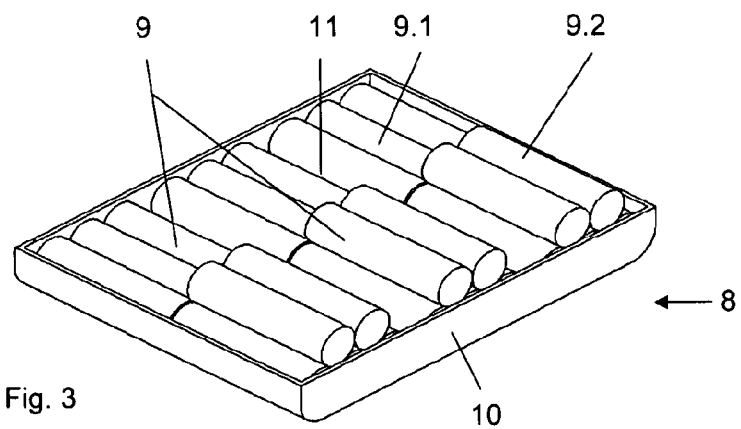
Figure 4:
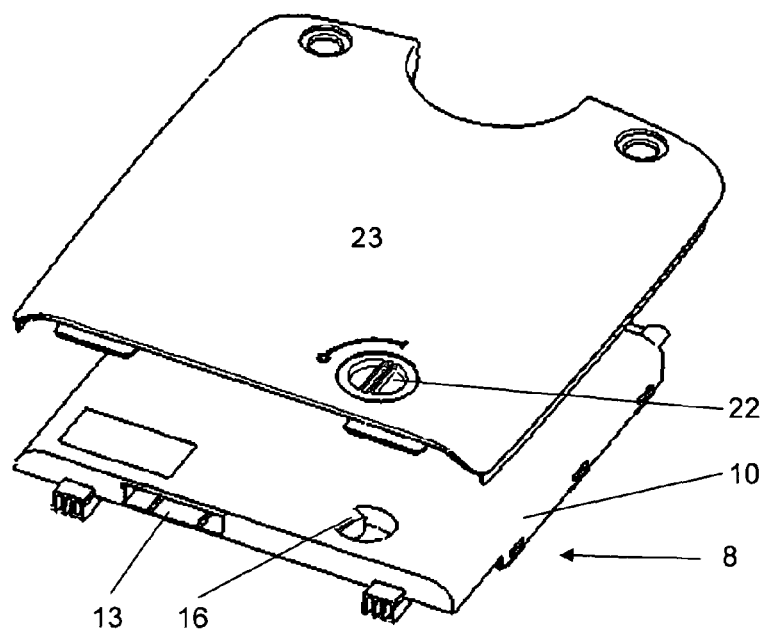
Figure 6:
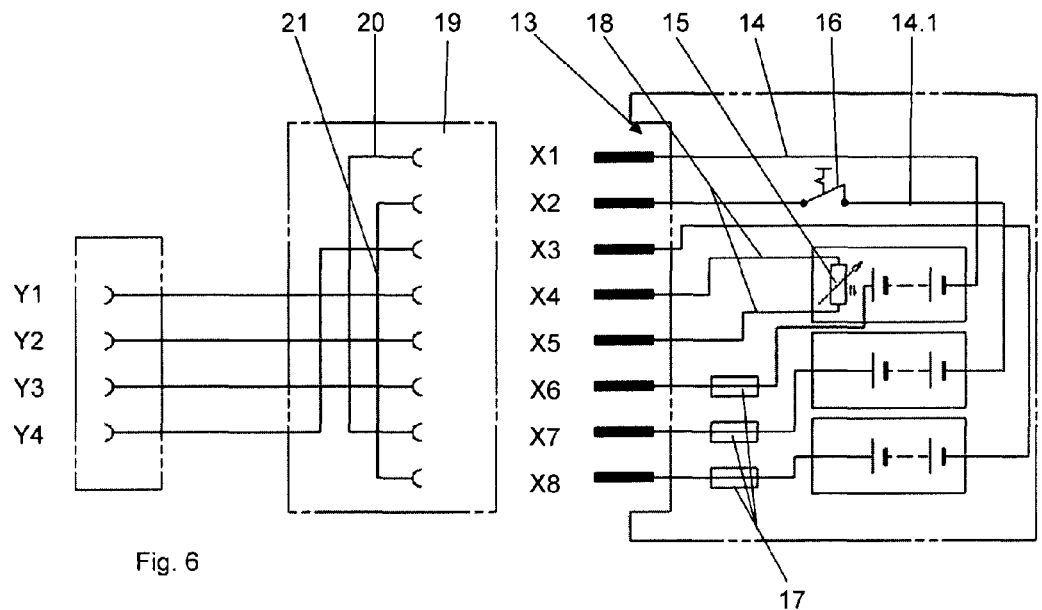
FIG. 6 is a circuit diagram of the storage battery pack of FIGS. 2-4 and a connector assembly in accordance with an embodiment of the invention.

Cell groups A through C are spatially separated by partition walls 11, which are visible in FIGS. 1 and 3 and schematically indicated in FIG. 5. The electrical separation of cell groups A through C is accomplished by a special feature: The eight cells 9 in each of cell groups A through C are electrically interconnected in such a way that each of the three cell groups A through C reaches a voltage of 33.6 volts. The electrical contacting of the individual cells 9 to form cell groups A through C is effected internally within battery housing 10 by a welded connection with electrically conductive sheet-metal elements 12, which is only schematically indicated in FIG. 5 and will not be described further herein. However, cell groups A through C are not conductively connected to each other within storage battery pack 8. The individual connecting leads 14 of said cell groups are separately connected to a connector receptacle 13, which can be seen in FIGS. 4 and 5. This is also illustrated in the circuit diagram of FIG. 6, in which the individual terminal contacts are designated by reference numerals X1 through X8. The negative poles of cell groups A through C are connected to contacts X1 through X3, and the positive poles are connected to contacts X6 through X8. In addition, as shown in FIGS. 5 and 6, an NTC resistor 15, a switch 16, and three fuses 17 are provided in battery housing 10. NTC resistor 15 is used to measure the temperature in storage battery pack 8. It is disposed in cell group C in the region of the cells 9 that are located directly below motor fan chamber 2, which is where the highest temperatures are expected. Connecting leads 18 of NTC 15 are connected to terminal contacts X4 and X5. Fuses 17 prevent sustained short circuits from occurring in any of cell groups A through C. The function of switch 16 in line 14.1 from the negative pole of cell group B to terminal contact X2 will be explained later.

Figure 7:
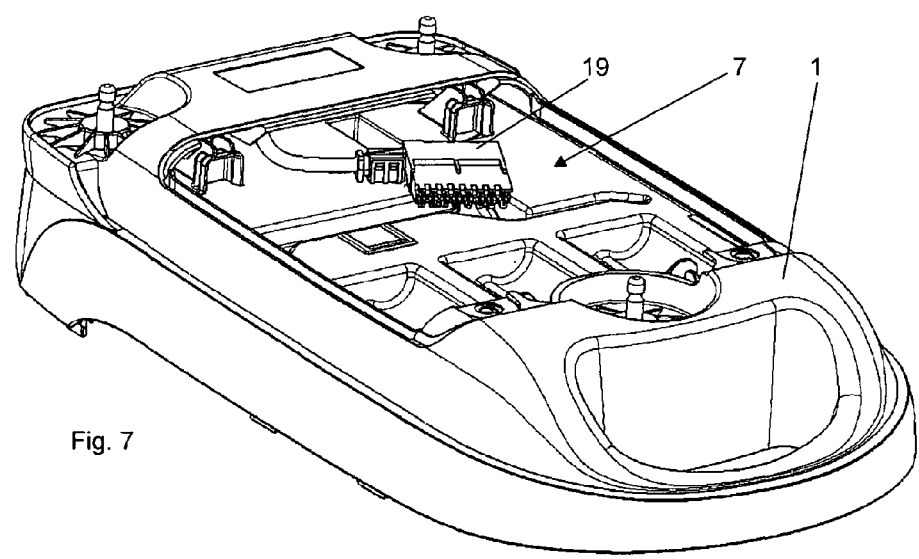
FIG. 7 shows receiving compartment of a vacuum cleaner in accordance with an embodiment of the invention.

FIG. 7 shows the underside of the vacuum cleaner, where the compartment 7 adapted to receive storage battery pack 8 therein is shown open. A male connector 19 is provided for establishing electrical contact between pack 8 and the electric motor, said male connector being engaged with connector receptacle 13 through insertion of pack 8. As can be seen in FIG. 6, male connector 19 is provided with two bridges 20 and 21 to connect contact X1 to contact X7 and contact X2 to contact X8, respectively. In this manner, the three cell groups A through C are all connected in a series 30, so that a total voltage of 100.8 volts will be present between lines Y3 and Y4. Bridges 20 and 21 ensure that a voltage higher than the safety extra-low voltage of 42 volts is produced only after male connector 19 is connected to connector receptacle 13.

Another prerequisite for the presence of the voltage at the electric motor is that switch 16 is closed. The closure of the switch is effected by the end user by turning rotary control 22 on cover 23 of receiving compartment 7 (see FIG. 4). Thus, the electrical separation of cell groups B and C (in series) from cell group A is eliminated only after transport from the manufacturing plant to the end user. In this manner, the dangerous goods transportation regulations are met even if the equivalent lithium content of the entire storage battery pack 8 exceeds the total permissible weight of 8 grams.

EXAMPLE

The equivalent lithium content (LEC) of a storage battery pack is calculated as follows:

$$LEC = 0.3 \; Q_{rated} \times N_{cells} \times \text{grams/ampere-hours},$$

where
$Q_{rated}$=rated capacity of a cell
$N_{cells}$=number of cells of the storage battery pack For a pack containing 24 cells of 1.6 ampere-hours each, the equivalent lithium content is 11.52 grams for the whole pack and 3.84 grams for each cell group. Thus, due to the electrical and spatial separation of cell groups B and C from group A, a maximum equivalent lithium content of 7.68 is achieved. Consequently, the 8-gram limit is not exceeded.

While the invention has been particularly shown and described with reference to preferred embodiments thereof, it will be understood by those skilled in the art that various changes in form and details may be made therein without departing from the spirit and scope of the invention.

What is claimed is:

1. An electrical appliance comprising a housing containing:
   an electric motor;
   a storage battery pack for energizing the electric motor at an operating voltage of more than 42 volts, the storage battery pack including a plurality of storage battery cells electrically connected so as to form at least two cell groups having a cell voltage of less than 42 volts; and
   a connector assembly including a bridge circuit configured to electrically connect the cell groups with each other so as to provide the operating voltage of more than 42 volts while establishing electrical connection between the storage battery pack and the electric motor.

2. The electrical appliance recited in claim 1, wherein the appliance is a canister vacuum cleaner.

3. The electrical appliance recited in claim 1, wherein the connector assembly includes a first part that is separate from the battery pack, the bridge circuit being part of the first part.

4. The electrical appliance recited in claim 1, wherein the plurality of storage battery cells are disposed in a battery housing, the battery housing including a first connector of the connector assembly, the first connector being a male connector or a connector receptacle.

5. The electrical appliance recited in claim 4, wherein the connector assembly includes a second connector separate from the battery pack, the bridge circuit being disposed in the second connector.

6. The electrical appliance recited in claim 4, further comprising a temperature sensor disposed in the battery housing, the temperature sensor including leads connected to terminal contacts of the first connector.

7. The electrical appliance recited in claim 6, wherein the temperature sensor is disposed in a vicinity of the electric motor.

8. The electrical appliance recited in claim 7, wherein the battery housing includes at least one partition wall separating a first and a second of the at least two cell groups.

9. The electrical appliance recited in claim 6, wherein the battery housing includes at least one partition wall separating a first and a second of the at least two cell groups.

10. The electrical appliance recited in claim 4, further comprising a switch disposed on the battery housing, the switch configured to disrupt electrical contact between the battery pack and the electric motor and electrical contact between a first and a second of the at least two cell groups.

11. The electrical appliance recited in claim 4, wherein the battery housing includes at least one partition wall separating a first and a second of the at least two cell groups.

12. The electrical appliance recited in claim 1, wherein the battery pack includes a temperature sensor having leads connected to terminal contacts included in the connector assembly.

13. The electrical connector recited in claim 12, wherein the temperature sensor is disposed in a vicinity of the electric motor.

14. The electrical appliance recited in claim 1, wherein the battery pack includes a switch configured to disrupt electrical contact between the battery pack and the electric motor and electrical contact between a first and a second of the at least two cell groups.

* * * * *